United States Patent [19]

Goldman et al.

[11] 4,192,482
[45] Mar. 11, 1980

[54] HYDRAULIC ACTUATOR TO PROVIDE BOTH ROTARY AND LINEAR MOTIONS TO A MOVABLE VALVE

[75] Inventors: Holliday L. Goldman, Red Lion, Pa.; Svend E. Winther, Copenhagen, Denmark

[73] Assignee: Allis-Chalmers Corporation, Milwaukee, Wis.

[21] Appl. No.: 952,996

[22] Filed: Oct. 20, 1978

[51] Int. Cl.² .................. F16K 39/06; F01B 21/00
[52] U.S. Cl. .................................. 251/56; 92/2; 91/189 R; 91/189 A
[58] Field of Search ............ 92/2; 251/56; 91/189 R, 91/189 A

[56] References Cited

U.S. PATENT DOCUMENTS

| | | | |
|---|---|---|---|
| 2,149,725 | 3/1939 | Canariis | 251/56 X |
| 2,154,555 | 4/1939 | Baer et al. | 92/2 |
| 2,326,686 | 8/1943 | Rutledge | 251/56 X |
| 3,823,651 | 7/1974 | Ogilvie | 92/2 |
| 3,961,559 | 6/1976 | Teramachi | 92/2 X |

Primary Examiner—Arnold Rosenthal
Attorney, Agent, or Firm—Robert C. Jones

[57] ABSTRACT

A hydraulic cylinder is provided with pistons to provide both rotary and a linear motions; utilization of a built in check valve traps fluid pressure to sustain piston in a desired operating position.

3 Claims, 3 Drawing Figures

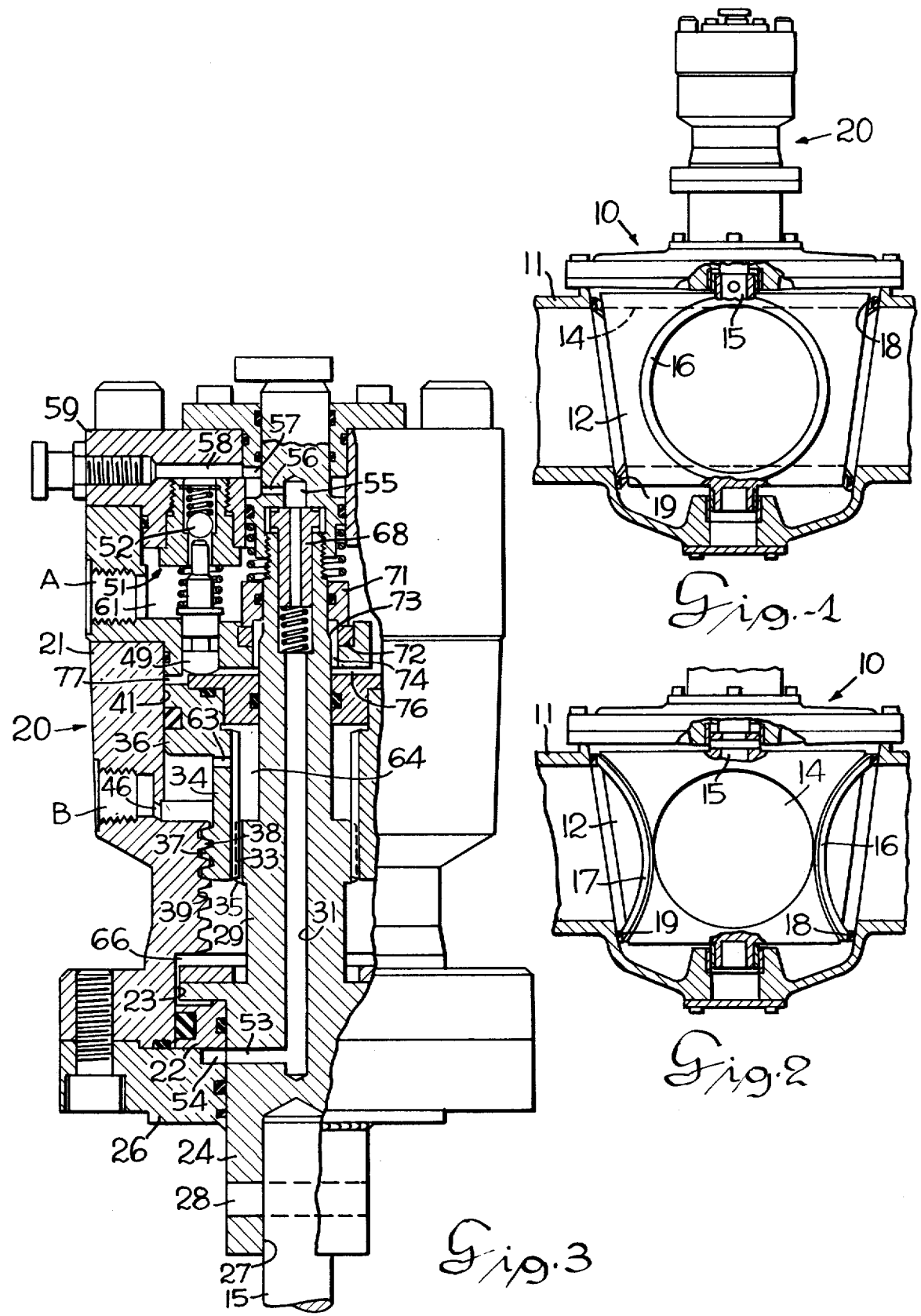

HYDRAULIC ACTUATOR TO PROVIDE BOTH ROTARY AND LINEAR MOTIONS TO A MOVABLE VALVE

BACKGROUND OF THE INVENTION

This invention relates to movable valves and more particularly to a hydralic actuator for providing both rotary and linear motion to the valve in an opening and closing operation.

With operating conditions changing wherein pressure through valves increases, larger size of valves are required. The increase in size of the valve requires more powerful actuators than the automatic actuators now available.

SUMMARY OF THE INVENTION

A hydraulic actuator for operating the plug of a valve between open and closed positions as fast as required. Prior to rotation of the plug into the open position the plug is moved along the axis of the plug to effect the disengagement of the plug from its seat. Thus, in an initial opening movement the hydraulic actuator imparts a lifting motion to the plug followed by rotation of the plug to open position to align the plug passageway with the flow passageway of the valve body. In a closing movement the valve plug is rotated to block the flow passageway an then lowered into sealed engagement with the seat.

DESCRIPTION OF THE DRAWINGS

FIG. 1 is a schematic showing of a valve with the hydraulic actuator connected to the valve plug; and the valve plug in elevated open position;

FIG. 2 is a showing similar to FIG. 1 with the valve plug in full closed position and in its lowered sealed position; and, FIG. 3 is an enlarged view in elevation of the actuator with parts broken away to show the operating components of the actuator.

DESCRIPTION OF THE INVENTION

A line valve 10, FIG. 1, includes a valve body 11 in which a valve plug 12 is operably disposed. The valve plug 12 is depicted in FIG. 1 in full open position wherein a fluid passage 14 is aligned with connected pipes to allow free flow through the valve. In full open position the valve plug 12 is in an elevated position within the valve body wherein spaced apart circular seats 16 and 17 on the valve plug 12 are not in sealing engagement but are in close proximity with associated circular seats 18 and 19 secured to the internal surface of the valve body. To move the valve plug 12 to a closed position the plug is rotated 90 degrees from the position depicted in FIG. 1 and thereafter lowered to effect sealing engagement of the seats 16-17 with the seats 18-19 as depicted in FIG. 2.

The rotational movement of the valve plug 12 between open and closed positions and the axial movement of the valve plug to an elevated or lowered position is difficult and requires special complex mechanical devices to accomplish the required movements.

To this end there is provided a fluid actuator 20 which is operably connected to a valve stem 15 associated with the valve plug 12. As shown in detail in FIG. 3, the actuator 20 includes a body portion 21 provided with an axial bore within which a lift piston 22 is axially movable within a first cylinder or chamber 23 formed in lower portion of the bore of the body 21. The lower end of the piston 22 is formed with a depending stem 24. The piston stem 24 extends through a suitable axial aligned opening formed in a base plate 26. An axial bore 27 in the piston stem 24 receives the extending end of the valve plug stem 15. A pin 28 establishes an operative connection between the cooperating engaged parts. Extending upwardly from the lifting piston 22 is a piston rod member or motion translation means 29 having an axial passage 31. Spaced from the upper surface of the lift piston 22, the rod 29 is provided with an enlarged portion having axial extending splines 35 which have engagement with internal splines 33 formed on the depending end of a stem 34 of a rotation drive piston 36. The outer surface of the depending stem 34 is provided with an acme threaded portion 37 which is in operative engagement with a cooperative threaded portion 38 formed in an internal bore portion 39 of the actuator body 21 and constituting a first rotational drive means. The rotation piston 36 is displaceably axially within a cylinder or chamber portion 41 formed within the housing bore above the threaded bore 39. Thus, fluid under pressure applied to one side or the other of the piston 36 will effect axial movement of the piston in a selected direction. For example, fluid pressure to the cylinder 41 at the head side of the piston 36 will operate to force the piston downwardly. In moving downwardly a rotational movement is imparted to the piston 36 and its associated stem member 34 by reason of the threaded engagement between the stem and the bore 39. This rotation movement is transmitted to the piston rod member 29 by operation of the spline drive connection established between the enlarged portion and the rotating piston stem 34. This rotation is, in turn, imparted to the valve plug 12 via the connected stem 15.

Fluid pressure to operate the actuator 20 in a line valve closing movement is admitted from a controlled source (not shown) to the actuator via a port B. The fluid pressure enters the cylinder 41 on the stem side of the rotating piston 36 via a passage 46. Pressure applied to the stem side of piston 36 will effect an upward movement of the piston to the position it occupies as depicted in FIG. 3. The piston 36 in moving upwardly will rotate by operation of the threaded engagement effected between the piston stem 34 and the bore 39 of the actuator body 21. The rotation of the piston 36 will effect rotation of the lift piston rod 29 by operation of the spline drive connection between the rod 29 and the stem 34. This rotation will rotate the valve stem 15 and thereby the valve plug 12 to rotate 90 degrees from its open position depicted in FIG. 1 to a closed position depicted in FIG. 2.

When the rotation piston 36 is in a full upward position it will engage a spring loaded pin 49 associated with an internal check valve 51 to unseat a check valve ball 52. With the check valve ball 52 unseated fluid pressure in a chamber 54 below the lift piston 22 will exhaust via a radial passage 53 in the stem member 24. The fluid will exhaust upwardly through the vertical passage 31 to a chamber 55 and thence by means of communicating passages 56 to 57 to a passage 58 in the cylinder head closure 59. With the ball 52 of the check valve 51 unseated, the fluid in passage 58 will exhaust through the check valve to a chamber 61 and flow out of the actuator through a port A to a system reservoir (not shown). With the fluid chamber 54 below the lift piston 22 connected to exhaust, fluid pressure in the cylinder 41 on the stem side of the piston 36 will flow through a radial passage 63 into a chamber 64 formed by the piston rod 29 and the bore of the rotating piston stem 34 and thence through the splines 33 and 35 into the chamber 66. Fluid will also flow downwardly through the threads 37 and 38 into a chamber 66 combining with the fluid flowing through the splines 33 and 35 will act on the top side of the lift piston 22 to force the piston downwardly thereby effecting the lowering movement of the line valve plug 12 from an elevated position to effect sealing engagement between the seats 16-18 and 17-19. With this condition obtained the valve plug 12 is in a closed position and sealed to prevent fluid flow through and around the valve plug 12. The pressure at port B sustains this condition until there is a signal to open the line valve 10.

Upon a signal to open the line valve 10 port B is connected to the reservoir or exhaust and fluid under pressure is supplied to port A. Fluid pressure flows into the chamber 61. Since the ball side of the check valve 51 has been relieved of pressurized fluid, as previously described, the fluid under pressure in the chamber 61 will move through the check valve 51 into the passage 58. From the passage 58 fluid under pressure will flow into the chamber 55 via connecting passages 57 and 56. From the chamber 55 the fluid under pressure will flow through a metering valve 68 which is sized according to the size of the line valve to be operated. The fluid continues through the metering valve 68 and the rod passage 31 into the radial passage 53 and thence to the chamber 54. Fluid under pressure in the chamber 54 will act on the under surface of the lift piston 22 causing the piston to move axially upwardly. This action effects axial upward movement of the stem 24 thereby effecting upward movement of the valve plug 12 to disengage the plug seats 16-17 from the valve body seats 18-19. The check valve operates to maintain the piston 22 and the associated rod 29 in uppermost position assuring that the line valve plug 12 will be maintained in an elevated position when in open condition.

With the valve plug 12 in an elevated position, it is free to be rotated from the closed position it occupies as depicted in FIG. 2 to its open position as depicted in FIG. 1. To this end the rod 29 upon reaching its uppermost limit of travel effects an upard displacement of a shaft ring 71 from its seat 72 by means of a shoulder 73 which engages and lifts the ring. Thus, the fluid under pressure in chamber 61 will flow into a chamber 74. From the chamber 74 fluid under pressure will flow through a communicating passage 76 to a chamber 77 above the rotating piston 36. The fluid pressure in chamber 77 will act on the piston 36 to force it downwardly. The downward movement of the piston 36 will effect its rotation by operation of the threaded connection between the piston stem 34 and the threads of the bore 39. This rotation effects rotation of the rod 29 by operation of the spline drive 33-35 thereby effecting the rotation of the valve plug 12 from a closed position as depicted in FIG. 2 to its open position as depicted in FIG. 1.

The embodiments of the invention in which an exclusive property or privilege is claimed are defined as follows:

1. A totally enclosed actuator for effecting axial and rotary movement of a valve plug between a seated closed position and an unseated open position including mechanism operated by a pressure medium comprising:
    a housing having a bore;
    a first piston deposed within the bore of said housing for axial movement by the pressure medium;
    coupling means connecting said first piston with the valve plug for effecting axial movement of the valve plug, wherein axial movement of said first piston in a first axial direction operates to unseat the valve plug and axial movement of said first piston in a second axial direction operates to seat the valve plug;
    a second piston disposed within the bore of said housing for axial and rotary movement;
    rotary drive means within said housing and operatively connected to said second piston to effect rotation of said second piston upon axial displacement thereof by the pressure medium, wherein the rotary movement of said second piston in a first direction operates to rotate the valve plug from a closed position to an open position and the rotary movement of said second piston in a second direction operates to rotate the valve plug from its open position to its closed position;
    drive means operatively connected to transmit the rotary movement of said second piston to said coupling means to effect rotation of the valve plug upon axial displacement of said second piston by the pressure medium; and,
    control means within said housing normally operable to prevent the movement of said first piston in its second direction of movement, said control means being constructed and arranged to be operated by said second piston upon said second piston completing its movement in its second direction wherein the valve plug is rotated from an open to a closed position.

2. A totally enclosed actuator according to claim 1 wherein said control means is a pressure medium check valve operable to restrict the flow of the pressure medium so as to maintain pressure on said first piston to maintain it at its limit of movement in its second direction of movement; and,
    mechanical means operated by said second piston reaching its limit of travel in its second direction wherein the valve plug is moved from an open position to a closed position to open said check valve and thereby remove the restriction to the flow of the pressure medium which maintained said first piston at its limit of movement in its second direction of movement.

3. An actuator operated by a pressure medium for effecting the movement of a member in two mutually transverse paths of travel;
    a housing;
    an axial bore within said housing a restricted portion;
    a first chamber formed within said bore on a first side of the bore restriction;
    a second chamber formed within said bore on the second side of the bore restriction;
    a first piston disposed within said first chamber for axial movement under the influence of the pressure medium;
    connecting drive means connected to said first piston to move with it, said connecting drive means being also connected to the member for effecting its movement in a first direction;
    a piston rod connected to said first piston and extending inwardly into said bore of said housing in coaxial relationship, said piston rod having an axial bore constructed and arranged to communicate with said first chamber on a first side of said first piston;

a second piston disposed within said second chamber in coaxial relationship with said piston rod of said first piston;

a stem connected to said second piston and surrounding said piston rod but spaced apart therefrom;

a first thread formed on said stem;

a second thread formed in the restricted portion of said bore, said first and second threads being in intermeshing engagement and operative to effect rotation of said second piston and said stem upon axial movement of said second piston;

a rotative drive means operatively connecting said stem and said piston rod in a manner to effect the rotation of said piston rod and said connecting drive means and thereby effect movement of the member in its second direction of movement;

a pressure medium circuit within the actuator for directing the pressure medium to said first chamber for effecting axial movement of said first piston in a first direction to thereby effect the movement of the member in its first direction, said pressure medium circuit including a first port and pressure medium connecting means to direct the pressure medium from said first port to said bore of said piston rod, said connecting means including a check valve operative to prevent the escape of the pressure medium from said first chamber on the first side of said first piston and maintain the first piston in its displaced position; and, operating means carried by said piston rod to open said second chamber to said pressure medium connecting means at the head side of said second piston to effect the axial displacement of said second piston and thereby rotation of said piston rod to effect movement of the member in its second direction.

* * * * *